US012125344B2

(12) United States Patent

Wang et al.

(10) Patent No.: US 12,125,344 B2
(45) Date of Patent: *Oct. 22, 2024

(54) GAMING SYSTEM PROVIDING MULTIPLE PLAYER SELECTABLE TOURNAMENTS

(71) Applicant: IGT, Las Vegas, NV (US)

(72) Inventors: Xiaochong Wang, Beijing (CN); Hujun Dong, Beijing (CN)

(73) Assignee: IGT, Las Vegas, NV (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/313,445

(22) Filed: May 8, 2023

(65) Prior Publication Data

US 2023/0316858 A1 Oct. 5, 2023

Related U.S. Application Data

(63) Continuation of application No. 17/412,678, filed on Aug. 26, 2021, now Pat. No. 11,694,509, which is a continuation of application No. 16/712,305, filed on Dec. 12, 2019, now Pat. No. 11,138,828.

(51) Int. Cl.
*G07F 17/32* (2006.01)

(52) U.S. Cl.
CPC ...... *G07F 17/3239* (2013.01); *G07F 17/3276* (2013.01)

(58) Field of Classification Search
CPC ....................................................... G07F 17/32
See application file for complete search history.

(56) References Cited

U.S. PATENT DOCUMENTS

| | | | |
|---|---|---|---|
| 6,287,202 | B1 | 9/2001 | Pascal et al. |
| 6,652,378 | B2 | 11/2003 | Cannon et al. |
| 7,582,011 | B2 | 9/2009 | Maling |
| 7,690,996 | B2 | 4/2010 | Iddings et al. |
| 7,798,901 | B2 | 9/2010 | Nguyen et al. |
| 8,317,620 | B2 | 11/2012 | Kelly et al. |
| 8,622,793 | B2 | 1/2014 | Ford |
| 8,702,520 | B2 | 4/2014 | Seelig et al. |
| 10,235,841 | B2 | 3/2019 | Nguyen et al. |
| 10,373,442 | B2 | 8/2019 | Schlottmann et al. |
| 2002/0039923 | A1 | 4/2002 | Cannon et al. |
| 2002/0183105 | A1 | 12/2002 | Cannon et al. |
| 2003/0060264 | A1 | 3/2003 | Chilton et al. |
| 2004/0266533 | A1 | 12/2004 | Gentles et al. |
| 2006/0157934 | A1 | 7/2006 | Yoseloff et al. |
| 2009/0131175 | A1 | 5/2009 | Kelly et al. |
| 2011/0077071 | A1 | 3/2011 | Decasa et al. |
| 2012/0302310 | A1 | 11/2012 | Kelly et al. |
| 2016/0314660 | A1 | 10/2016 | Nguyen et al. |
| 2017/0076553 | A1 | 3/2017 | Washington et al. |
| 2018/0322723 | A1 | 11/2018 | Lemay et al. |

OTHER PUBLICATIONS

"IGT Tournament Manager—Video Poker and Slot Tournaments Made Easy", Copyright 2013 IGT (1 page).

*Primary Examiner* — Omkar A Deodhar
(74) *Attorney, Agent, or Firm* — Neal, Gerber & Eisenberg LLP

(57) ABSTRACT

Gaming systems and methods that provide multiple player selectable tournaments that can be created by the operator of the gaming system or by one or more players of one or more of the gaming machines of the gaming system.

19 Claims, 6 Drawing Sheets

GAMING SYSTEM PROVIDING MULTIPLE PLAYER SELECTABLE TOURNAMENTS

PRIORITY

This application is a continuation of, claims the benefit of and priority to U.S. patent application Ser. No. 17/412,678, filed on Aug. 26, 2021, which is a continuation of, claims the benefit of and priority to U.S. patent application Ser. No. 16/712,305, filed on Dec. 12, 2019, now U.S. Pat. No. 11,138,828, issued on Oct. 5, 2021, the entire contents of both of which is incorporated by reference herein.

BACKGROUND

The present disclosure relates to gaming systems that provide multiple player selectable tournaments. Gaming systems may provide player tournaments. Gaming systems may provide one or more tournament awards to one or more players. Gaming systems may provide timed tournaments for players.

BRIEF SUMMARY

Various embodiments of the present disclosure provide a gaming system including a processor and a memory device storing a plurality of instructions, that when executed by the processor, cause the processor to create a player created tournament based on tournament creation data received from a gaming machine, the tournament creation data associated with a player selected one of a plurality of different tournaments for play by players of a plurality of gaming machines, the tournament creation data associated with a player selectable rule for the player created tournament. The plurality of instructions, when executed by the processor further cause the processor to, for each of a plurality of gaming machines, communicate created tournament data to the gaming machine to enable display of an indication of the player created tournament in which a player at the gaming machine can participate. The plurality of instructions, when executed by the processor further cause the processor to, based on a minimum quantity of players of the plurality of gaming machines requesting to participate in the player created tournament, operate the player created tournament at gaming machines of the players requesting to participate in the player created tournament, and determine a winner of the player created tournament.

Various embodiments of the present disclosure provide a gaming system including a processor and a memory device storing a plurality of instructions, that when executed by the processor, cause the processor to receive data from an operator access device to create a plurality of different operator created tournaments for participation by players of a plurality of gaming machines, wherein each operator created tournament comprises a plurality of different operator selected rules for that operator created tournament. The plurality of instructions, when executed by the processor further cause the processor to communicate created tournament data to the gaming machines to enable display of indications of each of the plurality of operator created tournaments that the players at the gaming machines can participate in, and such that each of the gaming machines can display the indications of each operator created tournament in a service window displayed by that gaming machine. The plurality of instructions, when executed by the processor further cause the processor to, receive data associated with the players of the gaming machines requesting to participate in the operator created tournaments, and for each operator created tournament that a minimum quantity of players of the gaming machines want to participate in, operate with the gaming machines to receive a fee for the selected operator created tournament from each of said players and provide the selected operator created tournament for said players to participate in, and determine a winner of that operator created tournament.

Various embodiments of the present disclosure provide a method of operating a gaming system, wherein the method includes creating, via a processor, a player created tournament based on tournament creation data received from one of a plurality of gaming machines, the tournament creation data associated with a player selected one of a plurality of different tournaments for play by multiple players of the gaming machines, and a player selectable rule for that tournament. The method further includes communicating created tournament data to the plurality of gaming machines to enable display of indications of the player created tournament that the players at the plurality of gaming machines can participate in. The method further includes receiving data associated with the players of the gaming machines requesting to participate in the player created tournament, and responsive to a minimum quantity of players of the gaming machines requesting to participate in the player created tournament, operating with the gaming machines to provide the player created tournament for said players to participate in, and determine a winner of the player created tournament.

Additional features are described in, and will be apparent from, the following Detailed Description and the figures.

DETAILED DESCRIPTION

Multiple Player Selectable Tournaments

Figure 1:
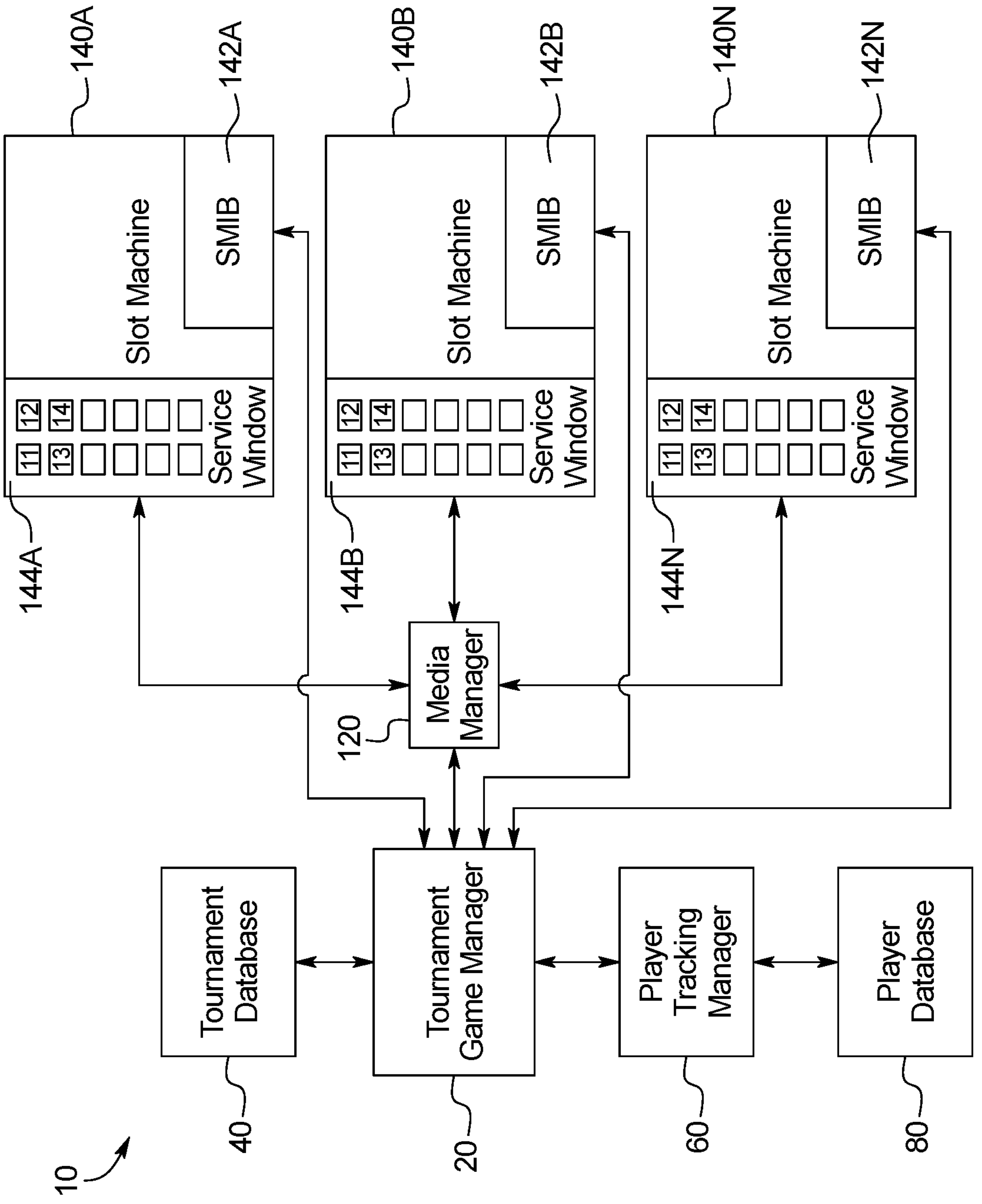
FIG. 1 is a schematic diagram of an example gaming system of one embodiment of the present disclosure.

The present disclosure relates generally to gaming systems and methods of operating gaming systems that provide multiple player selectable tournaments. The present disclosure relates also generally relates to tournament gaming systems and methods of operating tournament gaming systems that operate in a casino or gaming environment. In various embodiments, the gaming system provides multiple player selectable tournaments that can be created by the operator of the gaming system for selection by one or more players of one or more of the electronic gaming machines ("EGM(s)") of the gaming system. In various other embodiments, the gaming system provides multiple player selectable tournaments that can be created by one or more players of one or more of the EGMs of the gaming system for selection by one or more players of one or more of the EGMs of the gaming system. In various other embodiments, the gaming system provides multiple player selectable tournaments that can be created by the operator of the gaming system or by one or more players of one or more of the EGMs of the gaming system for selection by one or more players of one or more of the EGMs of the gaming system. In various such embodiments, the gaming system enables each player at each EGM of the gaming system to selectively see each created available tournament and selectively participate in one or more of the available tournaments from that EGM. The gaming system thus enables EGMs that are not dedicated tournament EGMs as well as EGMs that are not switched to a dedicated tournament mode to facilitate player selected tournament play.

In various embodiments, the gaming system is configured to, for each of a plurality of the EGMs, create one or more player created tournaments based on tournament creation data received from the EGM, the tournament creation data associated with a player selected one of a plurality of different tournaments for play by multiple players of the EGMs, and one or more player selectable rules for that tournament. In various embodiments, the gaming system is configured to, communicate created tournament data to the each of the EGMs to enable display of indications of each player created tournament that the player at that EGM can participate in along with a player that created that tournament. In various embodiments, the gaming system is configured to, receive data associated with the player of each EGM requesting to participate in one of the player created tournaments. In various embodiments, the gaming system is configured to, for each player created tournament that a minimum quantity of players of the EGMs wants to participate in, operate to provide via the EGMs the selected player created tournament for the players to participate in, and determine a winner of that player created tournament. In various embodiments, the gaming system is configured to, for each of the plurality of gaming machines, cause the gaming machine to display the indications of each player created tournament in a service window displayed by that gaming machine.

In various embodiments, the gaming system is configured to, create one or more operator created tournaments based on tournament creation data received from an operator access machine, the tournament creation data associated with an operator selected one of a plurality of different tournaments for play by multiple players of the EGMs, and one or more operator selectable rules for that tournament. In various embodiments, the gaming system is configured to, communicate created tournament data to the each of the EGMs to enable display of indications of each operator created tournament that the player at that EGM can participate in. In various embodiments, the gaming system is configured to, receive data associated with the player of each EGM requesting to participate in one of the operator created tournaments. In various embodiments, the gaming system is configured to, for each operator created tournament that a minimum quantity of players of the EGMs wants to participate in, operate to provide via the EGMs the selected operator created tournament for the players to participate in, and determine a winner of that player created tournament. In various embodiments, the gaming system is configured to, for each of the plurality of gaming machines, cause the gaming machine to display the indications of each player created tournament in a service window displayed by that gaming machine.

In various other embodiments, the gaming system is configured to perform the above generally described operations for both player created tournaments and operator created tournaments.

In various other embodiments, the gaming system is configured to perform the above generally described operations for partially player created tournaments and partially operator created tournaments.

Turning now to FIG. 1, one example embodiment of a gaming system of the present disclosure is generally illustrated and indicated by numeral 10. In this illustrated example embodiment, the gaming system 10 includes: (1) a tournament game manager 20; (2) a tournament database 40; (3) a player tracking manager 60; (4) a player database 80; (5) a media manager 120; and (6) a plurality of EGMs 140A, 140B, . . . 140N. It should be appreciated that the gaming system 10 may include one or more other suitable components such but not limited to one or more of the components described below in the second section of this description. In various embodiments, the tournament game manager 20, the tournament database 40, the player tracking manager 60, the player database 80, the media manager 120, and the plurality of EGMs 140A, 140B, . . . 140N are configured to enable the operator and/or players creation of the tournaments, the player selection of the created tournaments, and the play of the player selected tournaments (including the determination and provision of any awards resulting from the player of the player selected tournaments).

More specifically, in this example illustrated embodiment, the tournament game manager 20 includes a service running on a remote gaming server or remote host that is configured to communicate with or in communication with the tournament database 40, the player tracking manager 60, the player database 80, the media manager 120, and the plurality of EGMs 140A, 140, . . . 140N. In this example embodiment, the tournament game manager 20 is configured, for each of the player or operator created tournaments, to: (1) receive, compute, and transmit data associated with the creation of tournaments by the operator and/or players of the EGMs; (2) receive, compute, and transmit data associated with play of the tournament; and (3) analyze data associated with the play of the tournament to determine any award(s) associated with the play of the tournament for least one winner for the play of the tournament. In this example embodiment, the determined award(s) include(s), for each winning player for the play of the tournament, for one or more losing players of the tournament, a certain percentage of a wager amount placed by that losing player for the play of the tournament. It should be appreciated that in other embodiments of the present disclosure, the award(s) may be alternatively determined by the tournament game manager. In various embodiments, the tournament game manager is configured to manage multiple concurrent tournament and tournament games.

In this example illustrated embodiment, the tournament database 40 includes a service running on a remote gaming server or remote host that is configured to communicate with or in communication with the tournament game manager 20. In certain example embodiments, the tournament database 40 runs on the same remote gaming server as the tournament game manager 20. In other example embodiments, the tournament database 40 runs on a different remote gaming server than the tournament game manager 20. In one example embodiment, the tournament database 40 includes various data associated with the play(s) of the available operator and/or player created tournaments and player selected tournaments. For example, the tournament database 40 includes various different data, for one or more tournaments, associated with a play of that tournament via the gaming system 10. Such data may include but is not limited to: (a) game type for the play of the tournament, (b) player wager amount(s) for the play of the tournament, (c) game rules for the play of the tournament, (d) duration of the play of the tournament, and/or (e) the player or operator that created the tournament. It should be appreciated that the tournament database 40 may include data for past, current, and/or possible future tournaments created by the operator of the gaming system, and/or past, current, and/or possible future tournaments created by one or more players of one or more of the EGMs of the gaming system 10.

In this example illustrated embodiment, the player tracking manager 60 includes a service running on a remote gaming server or remote host that is configured to communicate with or in communication with the tournament game manager 20 and the player database 80. In one example embodiment, the player tracking manager 60 runs on the same remote gaming server as the tournament game manager 20. In another example embodiment, the player tracking manager 60 runs on a different remote gaming server as the tournament game manager 20. In one example embodiment, the player tracking manager 60 is configured to track or otherwise update (and save) award amounts such as expected award amount(s) (e.g., credits) for the winning player(s) and losing player(s) for the play of the tournament. In various embodiments, the player tracking manager 60 is configured to cause an update to the credit meters on each player's EGM of the gaming system 10 based on each player's performance during play of the tournament.

In this example illustrated embodiment, the player database 80 includes a service running on a remote gaming server or remote host that is configured to communicate or in communication with the player tracking manager 60. In one example embodiment, the player database 80 runs on the same remote gaming server as the player tracking manager 60. In another example embodiment, the player database 80 runs on a different remote gaming server as the player tracking manager 60. In one example embodiment, the player database 80 includes data associated with each player participating in the play of the tournament. For example, the player database 80 includes player data, such as but not limited to, for each player: (a) player name or other identification, (b) player gaming preferences, (c) player loyalty rewards information, (d) player tournament play history, (e) player tournament play wagering history, (f) player tournament creation history, and/or (g) player tournament created usage or play (by other players).

In this example illustrated embodiment, the media manager 120 includes a service running on a remote gaming server or remote host that is configured to communicate with or in communication with the tournament game manager 20 and each of the EGMs 140A, 140B, . . . 140N. In one example embodiment, the media manager 120 runs on the same remote gaming server as the tournament game manager 20. In another example embodiment, the media manager 120 runs on a different remote gaming server as the tournament game manager 20. In various example embodiments, the media manager 120 is configured to receive data and event signals from the tournament game manager 20. In various example embodiments, the media manager 120 is configured send data and event signals to the tournament game manager 20. In various example embodiments, the media manager 120 is configured to receive data and event signals from the plurality of EGMs. In various example embodiments, the media manager 120 is configured to send data and event signals to the plurality of EGMs.

For example, prior to starting a game for the play of the tournament, the media manager 120 causes a display by the service windows of the EGMs of a list of tournament arenas or groups (or other such tournament-participating locations). For example, a tournament arena or group may include a plurality of EGMs configured to play the same game type for the same enrollment wager or fee. It should be appreciated that an EGM may only be able to provide tournament play for one arena or group, or may be able to provide tournament play for multiple arenas or groups. As such, the media manager 120 enables the player to select one of the displayed arenas for possible play of available created tournaments in that arena. After the player of an EGM selects an arena (if there are multiple arenas available for selection), the media manager 120 causes a display by the service window of that EGM of a list of the created tournaments of that arena or group that the player may participate in. As such, the media manager 120 enables the player to select one of the displayed tournaments to join for the play of that selected tournament. In various example embodiments, during the play of the tournament, the media manager 120, transmits data to each of the EGMs participating in the play of the tournament. The transmitted data dynamically changes a display screen for each participating player's EGM. In various example embodiments, the transmitted data includes player data associated with the play of the tournament such as, but not limited to, the player's name, and the player's available credits for the play of the tournament.

In this example illustrated embodiment, the plurality of EGMs 140A, 140B, . . . 140N, each include a respective slot machine interface board ("SMIB") 142A, 142B, . . . 142N, respectively. In various example embodiments, each respective SMIB 142A, 142B, . . . 142N, includes a game monitoring service for the respective EGM 140A 140B, . . . 140N. More specifically, each respective SMIB 142A, 142B, . . . 142N is configured to track information associated with the play of the tournament for each respective EGM 140A, 140B, . . . 140N, such as, but not limited to: (a) the game session, (b) game status, (c) game name, (d) game type, (e) coin-in amount, (f) game result(s) (e.g., win or loss), and/or (g) wager amount. It should be appreciated that the quantity of EGMs of the gaming system can vary in accordance with the present disclosure. The SMIB may also include software that when executed causes the fund or credit transfers between the player and the EGM credit meter in addition to monitoring and tracking such data.

In this example illustrated embodiment, the plurality of EGMs 140A, 140B, . . . 140N, are each configured to selectively display a respective service window 144A, 144B, . . . 144N on a display device (not shown) of the EGM under the control of the SMIB of that EGM]. In various example embodiments, the service window 144A, 144B, . . . 144N is configured to display information to each player of the respective EGM 140A, 140B, . . . 140N. More specifically, the service windows 144A, 144B, . . . 144N respectively display information associated with available tournament arenas and available tournaments in each arena such as the tournaments that are generally indicated by labels T1, T2, T3, and T4*m* as for play on each respective EGM 140A, 140B, . . . 140N in FIG. 1. The service windows 144A, 144B, . . . 144N, may be configured to display other information to the player of each of the respective EGMs 140A, 140B, . . . 140N, such as gaming establishment information, entertainment information, dining information, and other such player directed information.

In various example embodiment, the gaming system 10 is configured to cause the plurality of EGMs 140A, 140B, . . . 140N to display the plays of the tournament outside of the respective service windows 144A, 144B, . . . 144N on display devices of the EGMs under the control of the SMIB of that EGM.

In various example embodiment, the gaming system 10 is configured to cause the plurality of EGMs 140A, 140B, . . . 140N to display the plays of the tournament in the respective service windows 144A, 144B, . . . 144N on display devices of the EGMs under the control of the SMIB of that EGM. In various such embodiments, the gaming system 10 is configured to cause a display of a service window by each EGM of the gaming system on part of the display device of that EGM that displays the game interface but that is separate from the displayed game interface. In various embodiments, the gaming system 10 controls the service window for each EGM separately from the processor that displays the games displayed by the EGM. For example, the gaming system may cause an overlay of the service window on a portion (e.g., top, bottom, left, or right) of the EGM display device such that the service window displays one or more gaming establishment services in real-time while not preventing the display of plays of one or more games (such as wagering games and bonus games) on the EGM. More specifically, the service window provides an interactive player interface that enables communication of gaming establishment services between the player and gaming establishment such as, food orders, drink orders, gaming establishment special offers, player loyalty rewards, gaming establishment entertainment options, side-gaming applications, available gaming tournaments, and other such services. For example, in accordance with the present disclosure, the gaming system further utilizes the service window on each EGM of the gaming system to display or otherwise communicate available tournaments for play on each of the respective EGMs of the gaming system.

In various embodiments, the gaming system 10, and particularly the tournament game manager 20, the tournament database 40, the player tracking manager 60, the player database 80, the media manager 120, and the plurality of EGMs 140A, 140B, . . . 140N are configured operate together to: (1) enable an operator of the gaming system 10 to create any suitable quantity of operator-created tournaments for play by multiple players; (2) for each operator created tournament, enable the operator to select one or more rules for that operator created tournament; (3) enable one or more players of the EGMs of the gaming system 10 to create any suitable quantity of player created tournaments for play by multiple players; (4) for each player created tournament, enable the player that created that player created tournament to select one or more rules for that player created tournament; (5) enable each player at the EGMs of the gaming system 10 to cause that EGM to display (such as in a service window) indications of each of the then available operator and/or player created tournaments that the player at that EGM can participate in; (6) enable each player at the EGMs of the gaming system 10 to select one or more of the displayed then available operator or player created tournaments that the player wants to participate in; (7) for each selected operator or player created tournaments that the player at an EGM of the gaming system 10 wants to participate in, receive the appropriate tournament entry fee from the player for that operator or player created tournament (such as via the credit meter of the EGM); (8) provide and display (such as through the service window) the selected operator or player created tournament for the player to participate in; (9) for each operator or player created tournament, determine the winner(s) of that operator or player created tournament; and (10) for each winner of each operator or player created tournament, provide any award associated with that operator or player created tournament to the winning player(s).

In various example embodiments, such configuration of the gaming system 10 that easily enables tournament play on any casino games and/or any EGMs in a gaming establishment provides improvements to the gaming system such as, an improvement in the player's experience during play of a tournament, an increase in income generated by EGMs of the gaming system, an increase in player enjoyment and loyalty during play of a tournament on the EGMs of the gaming system, a reduction in maintenance costs for the gaming system by creating a centralized tournament management system, and other such improvements. Further improvements provided by the present disclosure are discussed below.

Figure 1A:
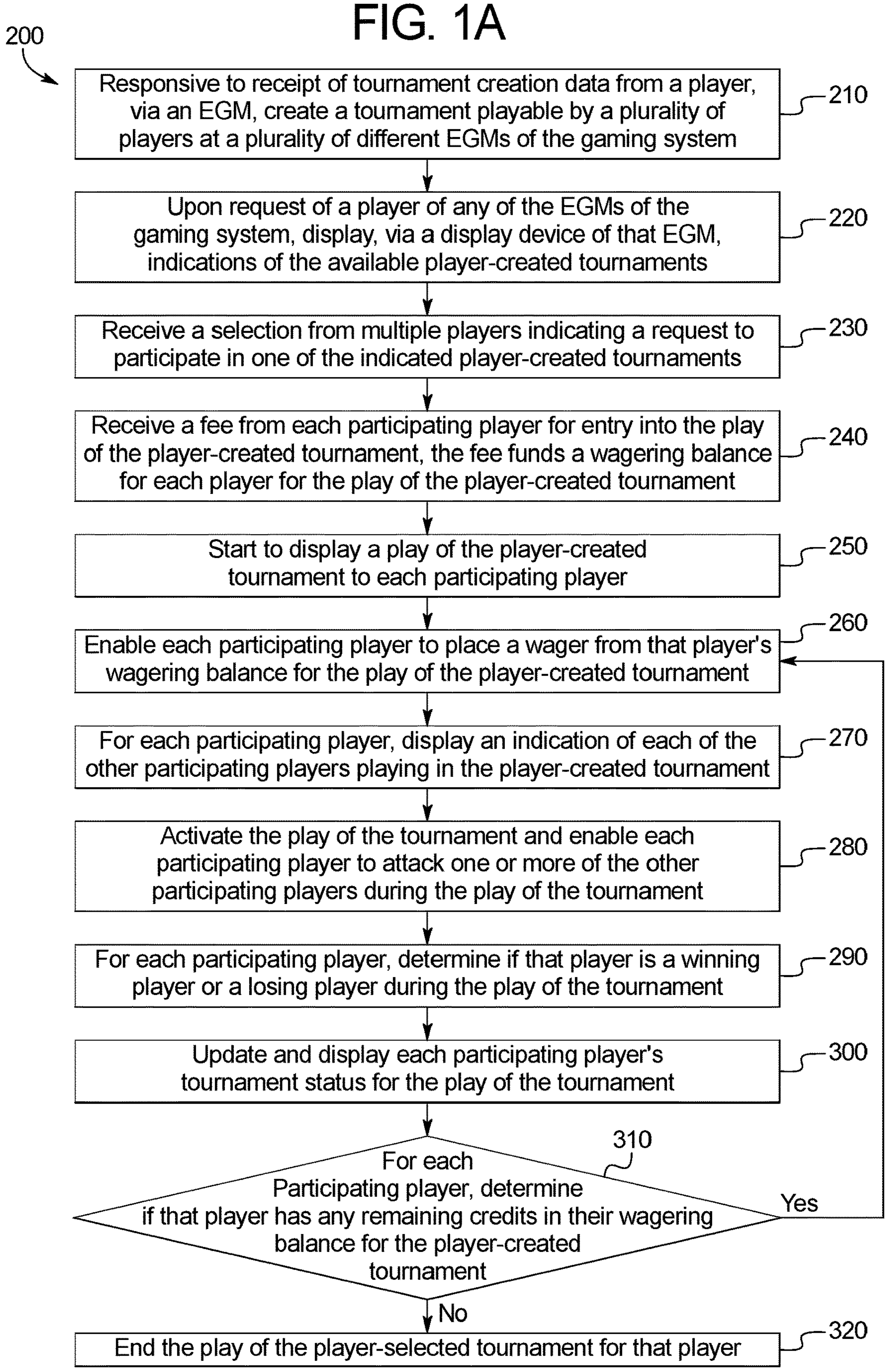
FIG. 1A is a flow chart of an example process for operating a gaming system of one embodiment of the present disclosure that provides multiple player selectable tournaments.

FIG. 1A is a flowchart of an example process or method 200 of operating an example gaming system of the present disclosure. In various embodiments, the process 200 is represented by a set of instructions stored in one or more memories and executed by one or more processors. Although the process 200 is described with reference to the flowchart shown in FIG. 1A, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In this illustrated example embodiment, the multi-player, player created tournament includes an entry fee that must be paid by each participating player. During play of the player created tournament, the gaming system creates a tournament wagering balance for each player based on the paid entry fee by that player and the gaming system enables the players to utilize their tournament wagering balance to place wagers for plays of or to play the player created tournament. In this illustrated example, each participating player continues playing in the tournament until that player's tournament wagering balance reaches zero (or the balance otherwise falls below a minimum wager amount needed to continue play of the player created tournament). In this illustrated example, when a player's wagering balance reaches zero (or the balance falls below the minimum wager amount needed), the gaming system terminates that player's play of the player created tournament. It should be appreciated that while the player created tournament is described as requiring an entry fee and placement of a wager for play of the tournament, other suitable types of tournaments are possible such as, payment of a single entry fee, timed tournaments, accumulated point tournaments, head-to-head tournaments, and other such tournaments. It should also be appreciated that while the multi-player tournament is described as a player created tournament, the gaming system may enable an operator of the gaming system (e.g., a gaming establishment) to create one or more operator created tournaments for play by multiple players on EGMs of the gaming system.

In operation of this example illustrated embodiment, as indicated by block 210, responsive to receipt of tournament creation data from a player, via that player's EGM, the gaming system enables creation of a tournament that is playable by a plurality of players at a plurality of different EGMs of the gaming system.

In one example embodiment, the gaming system enables a player to utilize any EGM within a gaming establishment to create a tournament for multiple players to compete in. In this example embodiment, the gaming system is configured to enable a player to select or enter data, via that player's EGM, associated with the creation of a tournament. For example, a player may utilize their EGM of the gaming system to enter or select tournament data (such as but not limited to, tournament type, tournament theme, tournament game type, and other such data associated with the creation of the tournament). In various example embodiments, the tournament game manager and the tournament database function to enable to the player to select an available tournament for creation and the other needed decisions for that tournament. In various example embodiments, the SMIB is configured to utilize the EGM to join a respective tournament game where the game is created in the service window.

In this example embodiment, once the player has created a tournament for possible play on EGMs of the gaming system, the gaming system makes the player created tournament available to any interested player playing at any EGMs of the gaming system via the service windows displayed by the respective EGMs. As such, in this illustrated example embodiment, the gaming system does not restrict the play of the player created tournament on certain tournament configured EGMs and/or within a certain area of the gaming establishment. In various example embodiments, one or more of the player created tournament utilizes a casino game configured to enable multiple players to compete against one another during the play of the player created tournament.

In one example embodiment, the player created tournament includes the simultaneous play of a reel based slot game by the participating tournament players at each player's EGM. As such, prior to the start of the play of the tournament, each of the EGMs of the gaming system displays a set of reels associated with the slot game for the play of the tournament. In this embodiment, each set of reels includes a plurality of different symbols associated with the play of the player selected tournament. It should be appreciated that while the tournament game is described as the play of a slot game, the tournament game may be any suitable type of game such as a video slot or reel game, a suitable video card game (such as but not limited to, a poker game, or a blackjack game), a Baccarat game, a keno game, a bingo game, or other such suitable game.

In this example illustrated embodiment, once a player creates a player created tournament, the gaming system makes that tournament available for other players to join. For example, as indicated in block 220, upon request of a player of any of the EGMs of the gaming system, the gaming system is configured to cause a display, via a display device of that EGM, of indications of available player created tournaments. In this example embodiment, the gaming system displays the indications of available player created tournaments in a service window displayed by the EGM (such as player created tournaments T1, T2, T3, and T4 displayed in service windows 144A, 144B, . . . 144N of FIG. 1). As such, players of each EGM of the gaming system may be notified of any available tournaments for play on that EGM while playing a game on their respective EGM. Upon notification of available tournaments, players can select or otherwise choose (or not select or otherwise choose) to enter into play of one of the displayed available tournaments for play on that EGM.

In this example illustrated embodiment, after the gaming system displays, via display devices of the plurality of EGMs, indications of the available player created tournaments, the gaming system may receive a selection from one or multiple interested players each indicating a request to participate in one of the indicated player created tournaments, as indicated in block 230. In one example embodiment, the gaming system enables players to request to participate in one of the indicated player created tournaments until a designated quantity of players is reached (e.g., 20 players). In one example embodiment, the gaming system enables interested players to request entrance into a desired player created tournament until the designated quantity of players is reached for the play of that tournament. In another example embodiment, the gaming system enables players to request to participate in one of the indicated player created tournaments for a specified time (e.g., sign up within the next 5 minutes).

In this example illustrated embodiment, once the gaming system receives a player's request for participation in a player created tournament, the gaming system receives a fee from each participating player for entry into the play of the player created tournament, the fee funds a tournament wagering balance or account for each player for the play of the player created tournament, as indicated by block 240. In this example embodiment, player created tournament is configured as an elimination-type tournament and each participating player continues play of the tournament until they are eliminated. As such, during play of the player created tournament, certain of the participating players are eliminated from the play of the tournament and play of the player created tournament continues until there is only one participating player remaining for the play of the player created tournament. It should be appreciated that non-player elimination tournaments may additionally or alternatively be provided by the gaming system of the present disclosure.

In various example embodiments, the duration of play of the player created tournament may be determined based on an entry fee amount paid by the players, one or more game outcomes achieved by the players, a certain quantity of winning game outcomes achieved by the players, or other such criteria. In other example embodiments, the duration of play of the player created tournament may be unlimited until an occurrence of a termination event. In other example embodiments, the gaming system determines the duration of the player created tournament based on one or more other factors. In various other embodiments, each player has an incentive to play rapidly during play of the player created tournament and, thus, make as many actuations of an activation input device (of the EGM they are using to play the tournament) as possible during the duration of the player created tournament.

As indicated by block 250, once the gaming system receives the fee from each participating player, the gaming system causes the respective EGMs to start to display a play of the player created tournament to each participating player via that EGM. In this example illustrated embodiment, following the display of the player created tournament to each participating player, the gaming system enables each participating player to place a wager from that player's tournament wagering balance for the play of the player created tournament, as indicated by block 260.

In this example illustrated embodiment, during the play of the player created tournament, for each participating player, the gaming system displays an indication of each of the other participating players playing in the player created tournament, as indicated by block 270. In this example embodiment, the displayed indication of each other participating player of the player created tournament includes information such as a player's tournament wager balance, the player's score, a player's tournament position or rank, and/or other such information associated with the play of the player created tournament. As such, each participating player can utilize the displayed indication of each participating player to determine their performance compared to the other participating players during the play of the player created tournament.

In this example illustrated embodiment, the gaming system activates the play of the player created tournament and enables each participating player to attack one or more of the other participating players during the play of the player created tournament, as indicated by block 280.

In various example embodiments, the gaming system enables each participating player to utilize an attack event to attack one another during the play of the player created tournament. In various example embodiments, use of a player attack event against a certain player adversely impacts that attacked player's ability to win the tournament game of the play of the tournament. In one example, when a player employs a player attack event against another player, the employed player attack event reduces or eliminates that player's chance of winning the tournament game during the play of the player created tournament.

In various example embodiments, the gaming system provides each participating player the ability to earn or otherwise accumulate one or more player attack events for use during the play of the player created tournament. In various example embodiments, the gaming system enables players to earn one or more player attack events by winning a certain amount of units (such as credits) during the play of the player created tournament, or obtaining a certain result during the play of the player created tournament (e.g., matching a certain pattern of symbols in a slot game). In another example embodiment, the gaming system enables players to purchase one or more player attack events using units accumulated during the play of the player created tournament, using units of that player's tournament wagering balance, or other such form of payment. In another example embodiment, the gaming system randomly awards players one or more player attack events to utilize during the play of the player created tournament.

In various example embodiments, the gaming system enables or otherwise provides each participating player the ability to employ one or more accumulated player attack events against any other participating players of the player created tournament. In one example embodiment, the gaming system enables each participating player to specifically choose another participating player to employ the player attack event against such as the top participating player of the player created tournament, the lowest participating player of the player created tournament, or any other such participating player in the player created tournament. In another example embodiment, the gaming system enables each participating player to cause a random selection of another participating player to employ the player attack event against such as a random participating player in the top five participating players of the player created tournament, a random bottom five participating players of the player created tournament, or any other such random selection of a participating player of the player created tournament.

In this example illustrated embodiment, during the play of the tournament, for each participating player, the gaming system determines if that player is a winning player or a losing player during the play of the player created tournament, as indicated by diamond 290. In one example embodiment, if the gaming system determines that a certain participating player is a winning player, then the gaming system awards a quantity of units (such as credits) to that player as a result of being a winning player. On the other hand, in this example embodiment, if the gaming system determines that a certain participating player is a losing player, then the gaming system deducts a quantity of units (such as credits) from that player as a result of being a losing player during the play of the player created tournament. In various embodiments, the gaming system transfers at least a portion of the tournament wager balance of each losing participating player to the tournament wager balance of each winning participating winning player. As such, each losing participating player experiences a decrease in their tournament wager balance for the play of the player created tournament, and each winning participating player experiences an increase in their tournament wager balance for the play of the player created tournament.

In this example illustrated embodiment, the gaming system updates and displays each participating player's tournament status for the play of the tournament, as indicated by block 300. For example, after determining that a certain player is a winning player during the play of the player created tournament (as indicated by diamond 290), the gaming system updates that player's tournament wager balance to add a quantity of units (such as credits) to the wager balance for being a winning player. On the other hand, after determining that a certain player is a losing player during the play of the player created tournament (as indicated by diamond 290), the gaming system updates that player's tournament wager balance to subtract a quantity of units (such as credits) from the tournament wager balance for being a losing player.

In this example embodiment, each EGM of the gaming system provides a tournament update or outcome for each game played on that EGM during the play of the player created tournament. In various example embodiments, the tournament update indicates any units (such as credits) associated with the determined tournament outcome. For example, during play of the tournament, the gaming system deducts a 10 unit (credit) wager from each participating player's tournament wagering balance for the play of a slot game during the play of the tournament. If a participating player wins that slot game during the play of the player created tournament, the gaming system indicates, via that player's EGM, a notification or indication to that player that they won a certain quantity of units (e.g., the 10 credit wager for the play of the slot game plus an additional 10 credits). On the other hand, if a participating player loses that slot game during the play of the player created tournament, the gaming system indicates, via that player's EGM, a notification or indication to that player that they lost a certain quantity of units (e.g., the 10 credit wager for the play of the slot game).

In this example embodiment, the outcome of each game played as part of the player created tournament is subject to any player attack events employed against any of the participating players during the play of the player created tournament game. In this example embodiment, a player attack event employed against a certain player during the play of the player created tournament may adversely impact the quantity of units (such as credits) that player wins during the play of the player created tournament. As such, in one example embodiment, the gaming system updates the display of each participating player's units (such as credits) for the play of the player created tournament in that player's tournament status.

In some embodiments, the player tournament status update includes an indication to each of the participating players that a certain player is a winning player and/or that a certain player is a losing player. In some embodiments, the tournament status update includes a ranking or list (e.g., highest to lowest, or lowest to highest) of each participating player's wager balance for the play of the player created tournament. As such, the tournament status update may enable each participating player to determine how their performance compares with the other participating players during the play of the player created tournament.

In this example illustrated embodiment, following the update of each participating player's tournament status, the gaming system determines if that player has any remaining credits in their wagering balance for the player created tournament, as indicated by diamond 310. In this example embodiment, if the gaming system determines that a participating player has remaining credits in their tournament wagering balance for the play of the player created tournament, then the gaming system returns to block 260 and enables that player to place another wager from that player's tournament wagering balance for the play of the player created tournament. On the other hand, as indicated by diamond 310, if the gaming system determines that a participating player does not have any remaining credits in their tournament wagering balance for the play of the player created tournament, then the gaming system ends the play of the player created tournament for that player, as indicated by block 320.

It should be appreciated that the awards winnable via the tournament can be any suitable awards such as, but not limited to: (1) monetary credits or currency; (2) non-monetary credits or currency; (3) a modifier (e.g., a multiplier) used to modify one or more awards; (4) one or more free plays of a game; (5) one or more plays of a bonus game (e.g., a free spin of an award wheel, a free spin of the award generator, etc.); (6) one or more lottery based awards (e.g., one or more lottery or drawing tickets); (7) a wager match for one or more plays of the wagering game; (8) an increase in an average expected payback percentage of a bonus game and/or an average expected payback percentage of a primary game for one or more plays; (9) one or more comps (such as a free meal or a free night's stay at a hotel); (10) one or more bonus or promotional credits usable for online play; (11) one or more player tracking points; (12) a multiplier for player tracking points; (13) an increase in a membership or player tracking level; (14) one or more coupons or promotions usable within a gaming establishment or outside of the gaming establishment (e.g., a 20% off coupon for use at a retail store or a promotional code providing a deposit match for use at an online casino); (15) an access code usable to unlock content on the Internet; (16) a progressive award; (17) a high value product or service (such as a car); and/or (18) a low value product or service.

It should be appreciated that the tournament may have any suitable quantity of tournament winners. In various embodiments, the tournament award is provided to a single tournament player. In other embodiments, the tournament award is split equally among multiple tournament players. In other embodiments, the tournament award is split unequally among multiple tournament players based on any suitable factor, such as a quantity of units accumulated during the play of the tournament.

It should also be appreciated that the gaming system enables the player created tournament to be based on criteria other than most accumulated units (such as credits). In various such embodiments, the gaming system determines a tournament score or standing for each participating player based on occurrences of a designated event during the play of the player created tournament. It should be appreciated that the designated outcome or event may be any suitable outcome or event.

It should be appreciated that the tournament may include any suitable game. In one embodiment, the tournament includes the same type of game for each of a plurality of players. In another embodiment, the tournament includes two or more different types of games.

In certain other embodiments, entry into the player created tournament is free and the games that are provided to the players during the play of the player created tournament are each free games. In certain other embodiments, entry into the player created tournament is free but the gaming system requires payment or a wager for the play of each game during the player created tournament. In various embodiments, the gaming system requires the player to pay for one or more of the games of the player created tournament. In one embodiment, the player is required to pay for the entire player created tournament before the start of the tournament. In other embodiments, the gaming system requires the player to wager on one or more of the games. For example, the player must wager on every provided game and the wager amount is used to determine any units (such as credits) accumulated by that game. In certain embodiments, the gaming system requires a player to pay an entry free to participate in the tournament.

It should be appreciated that the present disclosure provides an improvement in gaming technology, in part, by utilization of a centralized tournament game management system that reduces maintenance costs of the gaming system.

It should be appreciated that the present disclosure provides an improvement in gaming technology, in part, by providing a fast paced feature for players and improving player experience by enabling player's to create a tournament based on any available game provided by the gaming system to the EGMs.

It should also be appreciated that the present disclosure provides an improvement in gaming technology and solves previously existing technical challenges, in part, by enabling any standalone EGM to participate in the play of a player created tournament (not just certain EGMs configured for tournament play). In various embodiments, the gaming system does not require the EGMs to have specific protocols tournament play. In various embodiments, the gaming system does not require the EGMs to have specific game that are specifically developed to support the tournament mode.

It should also be appreciated that the present disclosure provides an improvement in gaming technology, in part, by enabling multiple tournaments to be running at the same time.

It should also be appreciated that the present disclosure provides an improvement in gaming technology, in part, by providing a way for a player to create a tournament and automatically eliminating the tournament once the tournament is over.

It should also be appreciated that in different embodiments, one or more of: when a tournament creation event can occur; duration of the play of the tournament; and/or any determination disclosed herein, is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a sports betting terminal, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, a central controller, and/or a remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device)

is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 2:
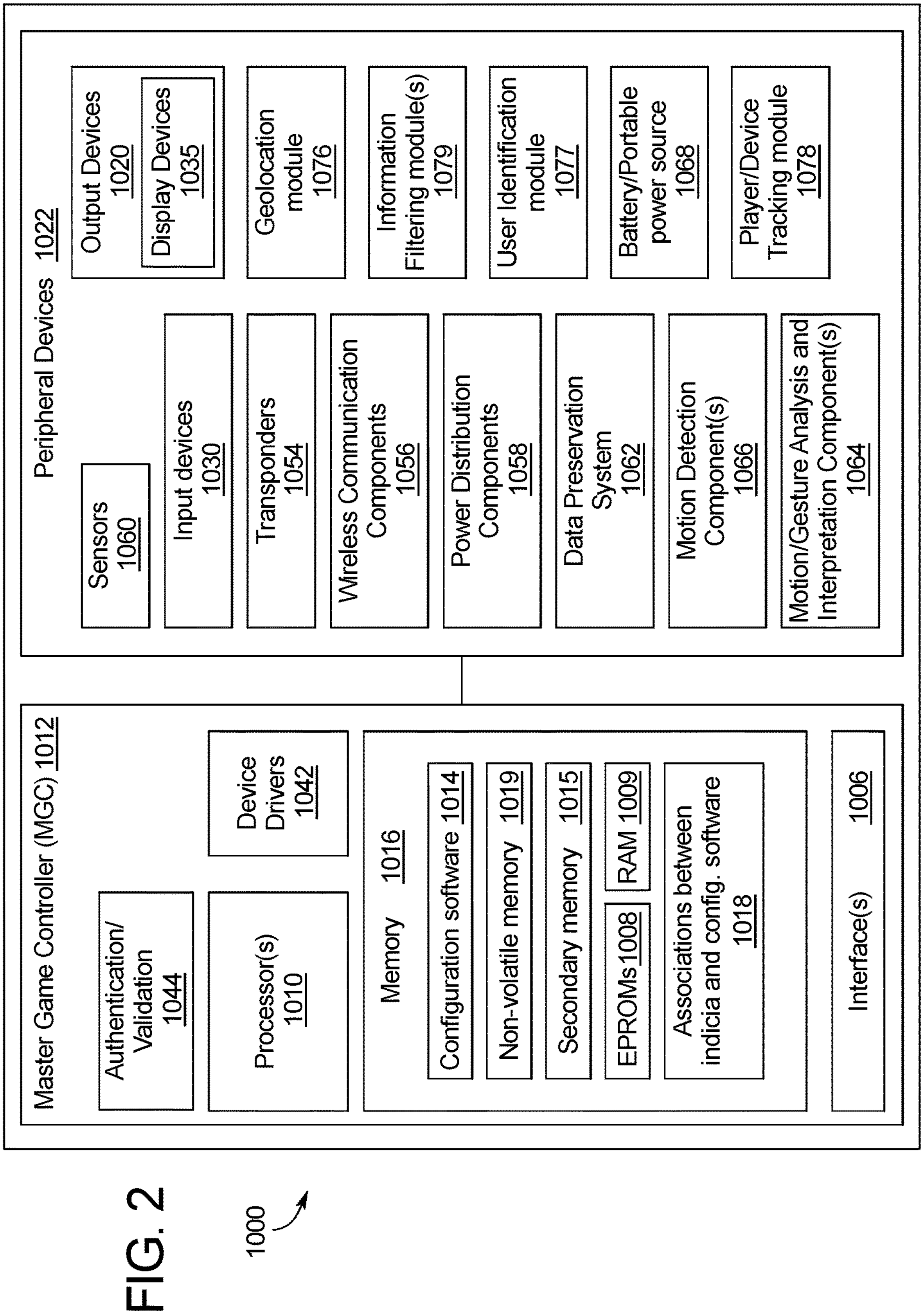
FIG. 2 is a schematic block diagram of one embodiment of an electronic configuration of an example gaming machine of a gaming system of the present disclosure.
Figure 3A:
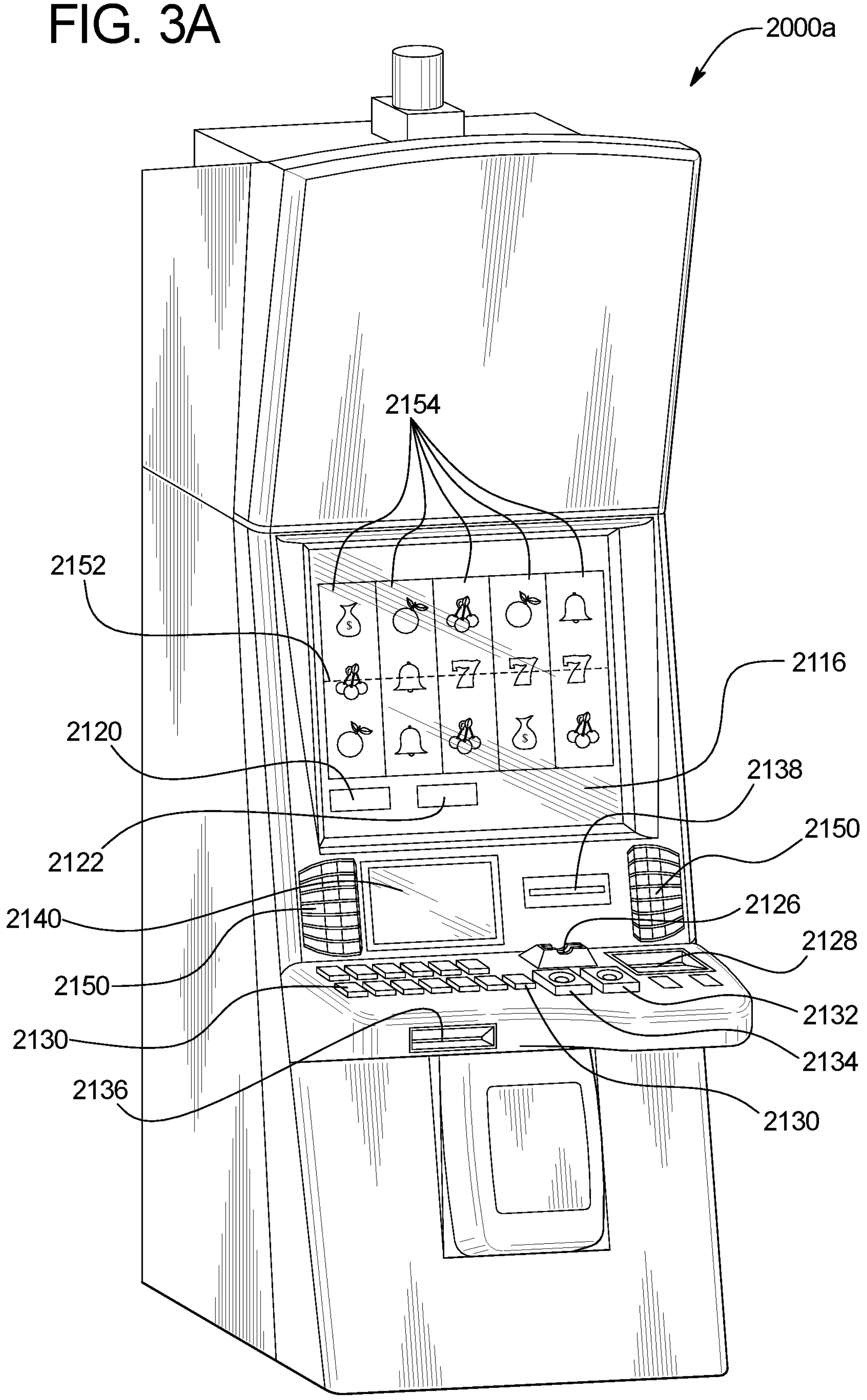
FIGS. 3A and 3B are perspective views of example alternative embodiments of the gaming machines of the gaming system of the present disclosure.
Figure 3B:
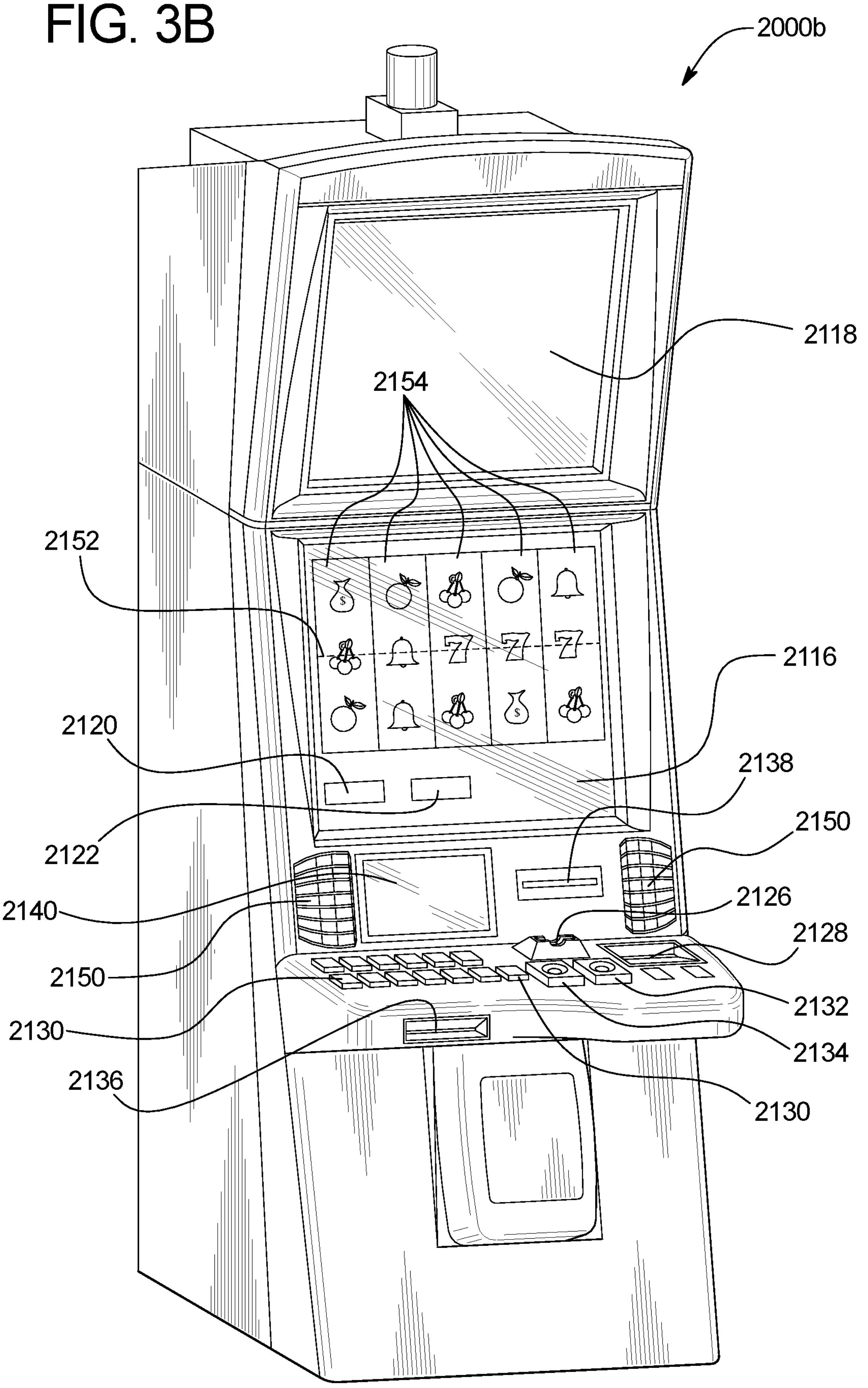
Figure 3C:
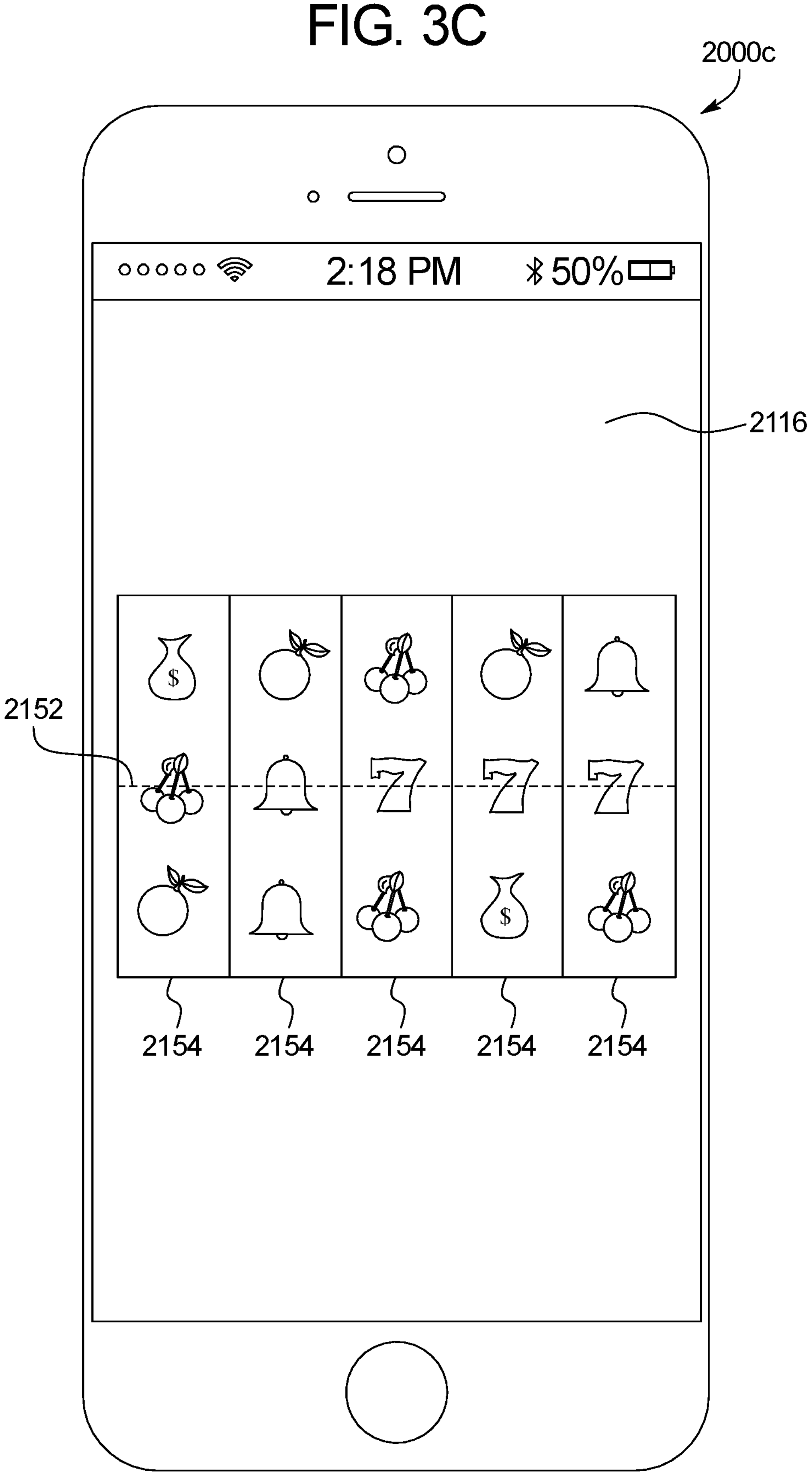
FIG. 3C is a front view of an example personal gaming device of the gaming system of the present disclosure.

FIG. 2 is a block diagram of an example EGM 1000 and FIGS. 3A and 3B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 3C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets."

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 3A includes a central display device 2116, a player tracking display 2140, a credit display 2120, and a bet display 2122. The example EGM 2000*b* illustrated in FIG. 3B includes a central display device 2116, an upper display device 2118, a player tracking display 2140, a credit display 2120, and a bet display 2122**.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs **2000*a* and 2000*b* illustrated in FIGS. 3A and 3B each include a ticket printer and dispenser 2136**. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method.'

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs **2000*a* and 2000*b* illustrated in FIGS. 3A and 3B each include a plurality of speakers 2150**. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 3A and 3B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 3A and 3B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 3A and 3B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 3A and 3B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 3A and 3B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 3A and 3B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 3A and 3B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 3B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the gaming system provides credits or other awards for one or more plays of one or more secondary games. The secondary game typically enables an award to be obtained in addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, period of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

Web-Based Gaming

In various embodiments, the gaming system includes one or more servers configured to communicate with a personal gaming device-such as a smartphone, a tablet computer, a desktop computer, or a laptop computer-to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, and/or a facial recognition sensor), and/or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, and/or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines and/or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device-such as a smartphone, a tablet computer, a desktop computer, or a laptop computer-to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity."

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network server to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum period of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents in a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A gaming system comprising:
a processor; and
a memory device storing a plurality of instructions, that when executed by the processor, cause the processor to:
enable an operator to partially create a tournament based on tournament creation data received via an operator interface and which comprises enabling the operator to select one of a plurality of different rules for the tournament;
enable a first player to partially create the tournament based on tournament creation data received via a player interface and which comprises enabling the first player to select another one of the plurality of different rules for the tournament,
wherein the tournament is playable by players of a plurality of gaming machines,
wherein the tournament creation data is associated with a selectable rule for the tournament,
for each of the plurality of gaming machines, communicate created tournament data to the gaming machine to enable display of an indication of the tournament in which a player of the gaming machine can participate; and
based on a minimum quantity of players of the plurality of gaming machines requesting to participate in the tournament, operate the tournament via gaming machines of the players requesting to participate in the tournament, and determine a winner of the tournament.

2. The gaming system of claim 1, wherein one of the selected rules enables each participating player of the tournament to accumulate a player attack event useable against another player of the tournament.

3. The gaming system of claim 1, wherein the plurality of instructions, when executed by the processor, cause the processor to enable the operator to select a plurality of different rules for the tournament.

4. The gaming system of claim 1, wherein the plurality of instructions, when executed by the processor, cause the processor to enable the first player to select a plurality of different rules for the tournament.

5. The gaming system of claim 1, wherein the plurality of instructions, when executed by the processor, cause the processor to, for each of the plurality of gaming machines, cause the gaming machine to display the indication of the tournament in a service window.

6. The gaming system of claim 1, wherein requesting to participate in the tournament comprises paying a tournament fee.

7. The gaming system of claim 1, wherein the tournament comprises a player elimination tournament.

8. The gaming system of claim 1, wherein the tournament enables one player to win a portion of a tournament wager balance from another player.

9. The gaming system of claim 1, which comprises a tournament game manager, a tournament database, a player tracking manager, a player database, and a media manager.

10. A gaming system comprising:
a processor; and
a memory device storing a plurality of instructions, that when executed by the processor, cause the processor to:
for each of a plurality of gaming machines, communicate tournament data to the gaming machine to enable display of an indication of a tournament in which a player at the gaming machine can participate, wherein the tournament data is associated with a rule that enables each participating player of said tournament to accumulate a player attack event useable against another player of said tournament, wherein the tournament is partially operator created and partially player created; and
based on a minimum quantity of players of the plurality of gaming machines requesting to participate in the tournament, operate said tournament via gaming machines of the players requesting to participate in the tournament, and determine a winner of the tournament.

11. The gaming system of claim 10, wherein the plurality of instructions, when executed by the processor, cause the processor to enable the operator to select a plurality of different rules for the tournament.

12. The gaming system of claim 10, wherein the plurality of instructions, when executed by the processor, cause the processor to enable one of the players to select a plurality of different rules for the tournament.

13. The gaming system of claim 10, wherein the plurality of instructions, when executed by the processor, cause the processor to enable the operator to select one of a plurality of different rules for the tournament and enable one of the players to select another one of the plurality of different rules for the tournament.

14. The gaming system of claim 10, wherein the plurality of instructions, when executed by the processor, cause the processor to, for each of the plurality of gaming machines, cause the gaming machine to display the indication of the tournament in a service window.

15. The gaming system of claim 10, wherein requesting to participate in the tournament comprises paying a tournament fee.

16. The gaming system of claim 10, wherein the tournaments comprises a player elimination tournament.

17. The gaming system of claim 10, which comprises a tournament game manager, a tournament database, a player tracking manager, a player database, and a media manager.

18. A gaming system comprising:

a tournament game manager;

a media manager configured to communicate with the tournament game manager;

a processor; and a memory device storing a plurality of instructions, that when executed by the processor, cause the processor to:

receive data from a player access device to partially create, via the tournament game manager, a plurality of different tournaments for participation by players of a plurality of gaming machines, wherein each tournament comprises a player selected rule for that tournament;

receive data from an operator access device to partially create, via the tournament game manager, the plurality of different tournaments for participation by the players of the plurality of gaming machines, wherein each tournament comprises an operator selected rule for that tournament;

receive data from the media manager to create a list of available gaming machines of the plurality of gaming machines configured to play the plurality of different tournaments;

communicate created tournament data to said plurality of gaming machines to enable displays of indications of each of the plurality of tournaments that the players at the gaming machines can participate in, and such that each of the plurality of gaming machines can display the indications of the plurality of different tournament in a service window displayed by that gaming machine;

receive data associated with players of the plurality of gaming machines requesting to participate in the tournaments; and for each tournament that a minimum quantity of players of the plurality of gaming machines want to participate in, operate with the gaming machines to receive a fee for the selected tournament from each of said players and provide the selected tournament for said players to participate in, and determine a winner of that tournament.

19. The gaming system of claim 18, which comprises a tournament database, a player tracking manager, and a player database.

* * * * *